UNITED STATES PATENT OFFICE 2,723,263
Patented Nov. 8, 1955

2,723,263

CHROMIUM-CONTAINING MONOAZO DYESTUFFS

Werner Kuster and Guido Schetty, Basel, Switzerland, assignors to J. R. Geigy A. G., Basel, Switzerland, a Swiss firm No Drawing. Application March 16, 1953,
Serial No. 342,711

Claims priority, application Switzerland March 28, 1952

4 Claims. (Cl. 260—151)

The present process concerns the production of blue chromium-containing monoazo dyestuffs which are distinguished by an excellent affinity to wool and similar fibres even in a neutral to weakly acid dyebath. They are suitable therefore, for the fast dyeing of these fibres under conditions which are not detrimental to the fibres.

It has been found that chromium-containing monoazo dyestuffs with these valuable properties can be obtained if monoazo dyestuffs containing no sulphonic acid groups, of the general formula:

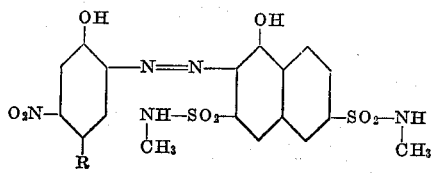

wherein R represents hydrogen, halogen or the methyl group, are treated with agents giving off chromium under such conditions that two molecules of monoazo dyestuff form a complex linkage with at least one chromium atom.

The monoazo dyestuffs according to the present invention are obtained by coupling diazotised 5-nitro-2-amino-1-hydroxybenzenes which may be substituted in the 4-position by halogen, advantageously chlorine, or by a methyl group, with 1-hydroxynaphthalene-3.6-disulphonic acid methyl amide in an alkaline medium and then treating the monoazo dyestuffs so obtained with agents giving off chromium in such amounts that there is at least 1 chromium atom to two molecules of dyestuff. The coupling component can easily be produced from 1-acyloxy-naphthalene-3.6-disulphonic acid or the alkali salts thereof by conversion with the aid of phosphorus pentachloride under mild conditions into the corresponding disulphonic acid chloride and reaction with methylamine whereupon the acyloxy group is saponified to the hydroxyl group in an aqueous-alkaline medium under heating.

Chroming can be performed according to various known methods, for example, by treatment with salts of trivalent chromium in an organic-aqueous solution, e. g. in ethanol or in formamide and water at a raised temperature by which method it is advantageous to convert the complex chromium compound into the alkali salt after first removing the organic solvent. However, the chroming process can be performed with particular advantage in aqueous solution or suspension with a neutral or weakly alkaline reaction by treatment with the alkali salts of disalicylato chromiates, under heating, in such amounts that there is at least 1 chromium atom to every 2 dyestuff molecules; it is advantageous to work with an excess of chroming agents.

After isolating by salting out and drying, the chromium containing azo dyestuffs according to the present invention are obtained as dark powders which dissolve in hot water with a greenish-blue colour. It is advantageous to mix them with capillary active dispersing agents and with small amounts of inorganic salts having a basic reaction such as trisodium phosphate.

Even from a neutral to weakly acid bath they dye wool and other fibres similar thereto such as silk, synthetic polyamide and polyurethane fibres in very even green-blue shades which have good fastness to wet treatments and light. If desired, the bath may contain ammonium salts of suitable organic or inorganic acids. They form a valuable addition to the group of new chromium-containing wool dyestuffs which can be dyed from a neutral to acid bath.

The products according to the present invention are distinguished from the previously known similar dyestuffs by their better drawing power on to wool from a neutral to weakly acid bath.

The following examples illustrate the invention without limiting it in any way. Parts are given as parts by weight and the temperatures are in degrees centigrade.

*Example 1*

18.9 parts of 5-nitro-2-amino-4-chloro-1-hydroxybenzene are dissolved with 4 parts of sodium hydroxide in 200 parts of water, 6.9 parts of sodium nitrite in 35 parts of water are added and this mixture is added dropwise at a temperature not exceeding 3° to 25 parts by volume of concentrated hydrochloric acid in 100 parts of water. A brownish-red suspension of the diazo compound is obtained. On completion of the diazotisation, the acidity of the diazo suspension is neutralised with sodium bicarbonate until there is a neutral reaction to Congo red paper whereupon a solution of 34 parts of 1.3.6-naphthol-disulphomethyl amide (M. P.=257–259°) and 12 parts of sodium hydroxide in 300 parts of water of a temperature of 0–3° is added. After adding 5 parts of 25% ammonia the temperature is allowed to rise slowly overnight to 20°, after which the dyestuff which has formed is filtered off and washed with 5% sodium chloride solution.

It dyes wool from an acid bath a bluish-red shade which, on after chroming, changes to greenish-blue.

The dyestuff can be chromed as follows:

The filter cakes of the o.o'-dihydroxyazo dyestuff are pasted in 1000 parts of water and 10 parts of 25% ammonia, 100 parts by volume of a solution of ammonium disalicylato chromiate (corresponding to 3 vol. per cent Cr) are added and the whole is heated for 6 hours at 90–100°. 100 parts of sodium chloride are then added, the chromium complex which precipitates is filtered off at about 70° and is washed with 5% sodium chloride solution and dried. It is a dark blue powder which dissolves in hot water with a blue and in concentrated sulphuric acid with a blue-violet colour. For use, it is advantageous to mix the dyestuff with trisodium phosphate and an anion active dispersing agent.

The dyestuff dyes wool from a neutral to weakly acid bath in greenish-blue shades which have very good fastness properties.

*Example 2*

15.4 parts of 5-nitro-2-amino-1-hydroxybenzene are dissolved with 4 parts of sodium hydroxide in 200 parts of water, 6.9 parts of sodium nitrite in 35 parts of water are added and this mixture is added dropwise at a temperature not exceeding 3° to 25 parts by volume of concentrated hydrochloric acid in 100 parts of water. A yellowish-red suspension of the diazo compound is obtained. On completion of the diazotisation, the acidity of the diazo suspension is neutralised with sodium bicarbonate until there is a neutral reaction to Congo red paper whereupon a solution of 34 parts of 1.3.6-naphtholdisulphomethyl amide and 12 parts of sodium hydroxide in 300 parts of water of a temperature of 0–3° is added. After adding 5 parts of 25% ammonia the temperature is allowed to rise slowly overnight to 20°, after which the dyestuff which has formed is filtered off and can be washed with 5% sodium chloride solution.

It dyes wool from an acid bath a bluish-red shade which, on chroming changes to greenish-blue.

A very similar dyestuff is obtained if in this example, the diazo component is replaced by 16.8 parts of 5-nitro-2-amino-4-methyl-1-hydroxybenzene or by 23.3 parts of 5-nitro-2-amino-4-bromo-1-hydroxybenzene.

If these dyestuffs are chromed by the method described in Example 1, the corresponding complex chromium compounds are obtained in the form of dark blue powders which dissolve in hot water with a blue and in concentrated sulphuric acid with a blue-violet colour.

They dye wool from a neutral to weakly acid bath in greenish-blue shades.

*Example 3*

10 parts of wool are entered into a 40° warm solution of 0.2 part of the chromium-containing dyestuff obtained according to example 1 in 400 parts of water, 1 part of anhydrous sodium sulphate and 0.3 part of ammonium acetate. The bath is boiled until the liquor is practically exhausted, which is for about 1 hour. The wool which has been dyed a strong greenish-blue is rinsed and dried.

What we claim is:

1. The complex chromium compound containing one chromium atom in complex linkage with two molecules of a monoazo dyestuff having the formula:

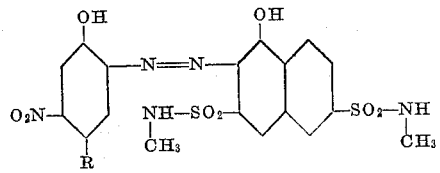

wherein R represents a member selected from the group consisting of H, Cl, Br and CH₃.

2. The complex chromium compound containing one chromium atom in complex linkage with two molecules of a monoazo dyestuff having the formula:

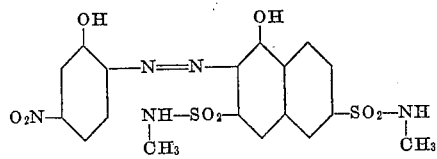

3. The complex chromium compound containing one chromium atom in complex linkage with two molecules of a monoazo dyestuff having the formula:

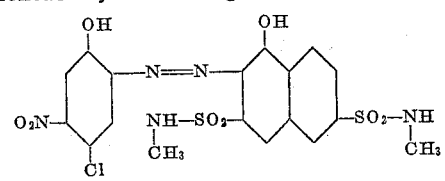

4. The complex chromium compound containing one chromium atom in complex linkage with two molecules of a monoazo dyestuff having the formula:

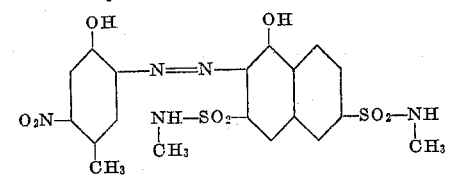

References Cited in the file of this patent

UNITED STATES PATENTS

| | | |
|---|---|---|
| 1,903,600 | Schweitzer | Apr. 11, 1933 |
| 2,534,646 | Widmer | Dec. 19, 1950 |
| 2,564,243 | Beech et al. | Aug. 14, 1951 |